PRINTED SPECIFICATION AVAILABLE
P. Sweet,
BEST AVAILABLE COPY
Brick Machine.
Patented Feb. 20, 1835
8652x
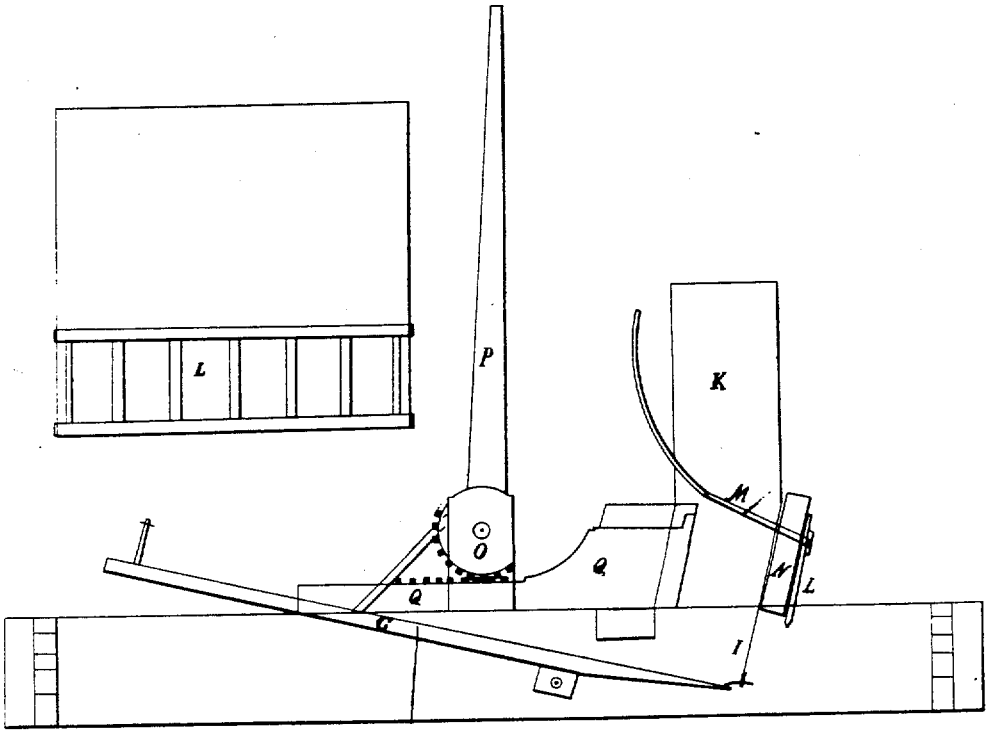
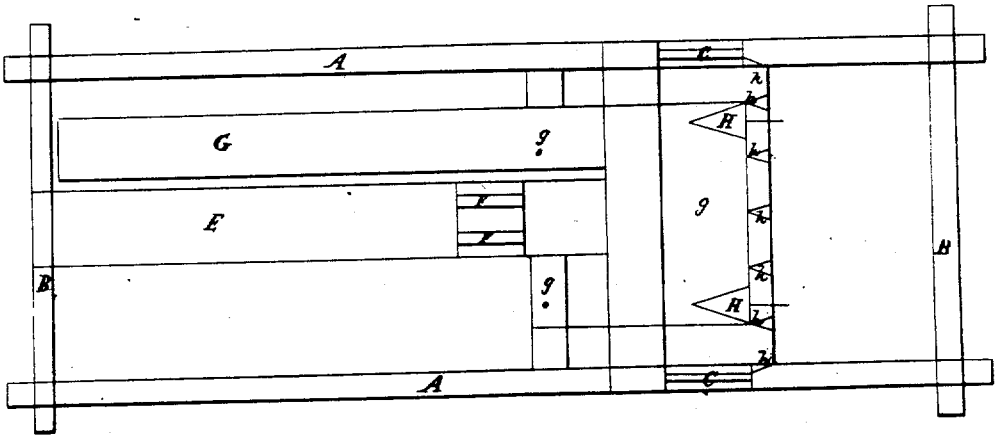

[illegible] 20 1855 8652 X [illegible]

Peley Sweet Ashtabula Ohio

Letters Patent.

The Schedule referred to in these Letters Patent, and making part of the same, containing a description in the words of the said Peley Sweet himself of his improvement in Brick making, called "Sweets Brick Striker."

To all to whom these presents shall come: Be it known that I Peley Sweet of Ashtabula in the County of Ashtabula and State of Ohio, have invented a new and useful improvement in the art of making Brick, and that the following is a full and exact description of the construction and operation of the said Machine as invented or improved by me, reference being had to the plates numbered and parts lettered sketched and accompanying this specification.

Plate 1. Birdseye view of the frame and several important parts fully described and referred to.

A.A. Side pieces 7½ feet long 2 inches thick 12 inches wide.

B.B. End pieces 3½ feet long 2 do thick 12 inches wide.

Width of the frame from inside to inside 2 feet 4½ inches clear.

Length of the frame from inside to inside 6 feet 8 inches clear.

C.C. 16¾ inches from the inside of one end of said frame commences a Mortice into each side piece 5 inches deep, one inch wide to admit the end of the hopper. Mortices to be 8 inches long on the end of each side piece.

D Crop sill. Immediately in rear of these Mortices is a crop sill framed into side pieces ¾ of an inch above their level, said piece 5 inches wide and 3½ inches thick.

E Stanchion Bearer; a piece of timber 7 inches wide and 6 inches thick, framed into and on a level with the crop sill; and into, and ½ inch above the level of the rear end piece.

F Mortices for the Stanchions 7½ inches from crop sill 6 inches long 1 inch wide 3 inches diameter from each other and through the bearer.

G. The foot lever to give motion to the knife, is formed of a piece of plank

8652X

1½ inches thick 5¼ feet long firmly ironed by rivets to a flat roller turning on 2 inch gudgeons, which said rollers play immediately under the rear of the cross sill and 3 inches below said sill. The plank in rear of the cross sill and roller is reduced to 6 inches wide on the left of the stancheons, but on the roller and at the front end is 19 inches wide see 2d.

H Irons passing through the knife. To the upper side of the front or wide end of said lever, are attached two irons shaped like a masons trowel, the blade part spiked to the plank by 3 spikes (2 in front and one in rear) and the handle part curved gently over from the blade ⅝ inch diameter and passing through the knife 16 in apart and at equal distance from the sides.

I see plate second. The knife for shaving the brick to a level with the surface of the moulds is formed of iron ⅛ of an inch thick, either of strong sheet or malleable wrought iron 13 inches wide and 29¾ inches long gently curved over to the front of the top like a curriers knife, — strengthened at the bottom by a bar of iron ¼ inch thick 1½ inches wide and 28½ inches long revited on and receives the two iron spurs of the foot lever through it together with the main iron of said knife K. Grooves (see plate 2d) are sawed into each side piece to admit each end of the knife and steady it, the grooves varying two inches in 9 from perpendicular, the upper part of the knife having the greatest front projection. These grooves are continued as high as the top of the generators by means of 2 pieces of cast iron extending from the top of the frame to the upright part of the hopper 2 inches wide 3/16 inch thick, grooved from the inner edges and attached by screws to the front of the hopper.

Plate 2. a side view of the Machine with the manner in which the foot lever is hung and attached to the knife.

K. The ends of the hopper, are composed of 1¾ inch plank inserted into side pieces by 8 inch tenons (see letter C) end pieces 2½ feet high & 10 inches wide. During the first 9¾ inches from the shoulder of the tenon or surface of the side piece each end piece slopes or projects to the front at a slope of 2 inches for every 9. from this point they ascend perpendicularly to the top. one half inch is grooved from the inner part of each end piece to the height

8652X height of 9 3/4 inches, this being the height of the propeller which acts
immediately under the groove shoulders. The front and rear sides
of the hopper are formed of boards one inch thick, upward from
where the hopper ascends perpendicularly. The end pieces of the Hopper from
inside to inside will be 30 1/2 inches distant. This space is partly
occupied in front by the generators (see letters h.h.h.h.h. on plate first) which
are seven pieces of wood edged in the rear and 7/8 inch thick in front.
Two of these may be formed semi_generators, being attached to the
inner front of each end piece of the hopper. The remaining 5 stand at 4
inches distance_across the open front of the hopper. Between these the
mortar is pressed forward into the molds as the lever descends.
they assist in forming the Brick, and protect the molds from injury.
These 5 pieces are Morticed into a bottom board that extends from the
knife grooves to the cross sill in rear of the Hopper. and are halved
into the perpendicular bottom front of the hopper, and secured there
by a strip of iron 1/8 inch thick and one inch wide which is attached
to the hopper by screws passing through it into the front board of the hopper.
The moulds (See plate 3d letter M) may be of any size or shape to
suit the maker and such parts of the Machine as are necessary varies
accordingly. They are described as forming bricks of common size.
The bars of the mold are all crosswise 5/8 of an inch thick. Each bar of the
mold is covered and protected by a generator as the mold is placed
edgewise in front of them to receive the Mortar, the Molds resting in
two sloping games cut into the upper part of the side pieces of the frame.
The mold stay is of two parts. First a 1 1/4 inch board (see letter
L.) falling a little below the molds in front of them where it turns
on 1 1/4 inch gudgeons let into the side pieces champered to 3/4
inch thickness at the other edge. The molds may be raised to a
position to receive the Mortar by raising up the board, around which
together with the moulds the arm stay is thrown to hold the molds
firmly to their place until filled. This board prevents the bottom
of the molds from being prest out and serves for the molds to rest on
(ready for the carrier) when it falls down on two sloping kleets,
the

8652X the Molds being full and the back or arm stay thrown up and with
=drawn by a downward pressure on the front part of it by the man at
the lever. M. the arm stay. an arm is attached to each end of the hopper
by an iron bolt one inch diameter the head inward, which bolts pass
through the end pieces of the hopper and are secured by nuts, said bolts
are 10½ inches from the surface of the side frame piece and 8 inches in
rear of the front. these arms are united by a substantial cross piece 5
inches wide firmly affixed to the ends of the arms, but the rear
ends of the arms play on the bolts as the arm stay is raised or
brought down to confine or liberate the molds either or both their
arms may extend to the rear of the hopper at a convenient slope, and
may be united there by a cross piece for the convenience of having the man
at the lever handle the molds with more facility.

N. an end view of the molds placed to receive the mortar and
supported by the board or back, and arm stays.

O. The Stanchions are 12 inches high 2 inches thick & 6 inches wide
passing through the stanchion bearer by inch tenons and keyed below,
they being placed two inches apart and 5 inches in rear of the
cross piece, and firmly secured in their rear by two braces two
inches from each other.

P. The Propelling Lever is a firm piece of timber four feet 9
inches long and 2 inches thick enlarging towards the main end
where it terminates in a semicircular shape. through the centre of
this circular termination is a hole bored with iron to 5/8 inch diameter
through which passes the bolt, and through the stanchions on which the
lever plays. from the centre to the circumjacent line of the wooden part
of the semicircle the distance is 3⅗ inches. around the circumjacent
surface of the semicircular end of the Lever is affixed firmly the seg=
ment of a cast iron cog wheel to the amount of a half circle exactly
of 5/8 inch base and 5/8 inch cogs, 1¼ inches wide 9/16 in space between
cogs. the number of cogs will be ten, and apparently at each end
of the iron a cog gives place to a 3/8 inch hole through the base of the iron.
Along the upper part of the Lever is a wrought iron back stay about
inches

8652X inches long rounded to a bolt at its front extremity, passing through the hole in the end of the cog segment, and is screwed by a nut. a bolt passes through the rear or lower end of the cog segment through the wooden part of the lever in the rear of the centre of the same circle, and through the back stay where it is nutted. The back stay at its extreme rear is further secured to the lever by a rivet. The bolt on which the lever plays is secured by a nut.

Q Q. The advanced Propeller is of two parts, viz. the beam, and the head. The beam is three feet long 2 inches thick, 10 inches of its front end are 6¾ inches wide, and its rear part 2½ inches of firm timber mortised into the centre of the head plank by a double tenon and braced to the same on each side. The upper portion of the head is the same as the fore head plank, 2 inches thick 8¾ inches wide and 30½ inches long, pinned to each other at the top. the upper plank resting at its centre on the forward or wide portion of the beam, and the front of the advanced propeller projects forward on the same slope as the under part of the hopper the space whereof it exactly fills. Thirteen inches in the immediate rear of the front board is the first of eleven cogs of the same base distance and height, as in the cog segment. the base being a straight piece of iron 1½ inches wide inserted into the centre of the beam the cogs extending from and above the surface and mutually acting with the cogs of the segment in giving motion to the advanced propeller. This latter cog iron is bolted at each end to the beam immediately under the bolt on which the lever hangs is a cast iron roller 3 inches diameter and 2 inches long turning on inch gudgeons in the Stanchion bearer, and just above the surface of the bearer for the beam to play on. These gudgeons should rest in steel boxes being subject to much pressure.

Plate 3. is a view of the open Molds set in position to receive the mortar; also a front view of the hopper.

The Operation of the Machine is; The lever is thrown up perpendicularly which draws the head of the advanced propeller to the rear of the hopper which will contain enough for 100 Brick. From the shape of the hopper there is little friction to

8652X to hinder the descent of the Mortar. the space between the head of th
advanced propeller and generators and Molds is filled; the lever
is brought down which throws the head of the advanced propeller forw
against the mass of Mortar between it and the molds, the mortar
cannot escape but is forced through the generator into the mold
(which may be twice filled by bringing the lever once down) the
Molds are at once filled perfectly; the man at the lever places one
foot on the foot lever, the knife is forced upward (touching the su
face of the molds) between the generators and Molds, the Morta
in the molds is thus separated from the mass in the hopper th
hand of the man touches the arm stay with a downward motio
and the Molds fall forward filled ready for the carrier. the knif
is drawn back by pulling the foot lever upward. and the same
process repeated.

The subscriber claims exclusively the discovery
of properly confining and supplying the mortar properly a
placing the Moulds, and forcing the Mortar into the molds a
by the immediate action of the propeller so as to leave no brick.
imperfect. The operation of the machine is rapid; sure to
produce perfect bricks (moulded in sand) and is the best o
labour saving Machine for the purpose within his knowledge Witnesses
P. R. Spencer
Wm Woodbury
Chester Ward Peleg Sweet (Drawing)

(25 45